(12) United States Patent
Fujitani et al.

(10) Patent No.: US 10,604,004 B2
(45) Date of Patent: Mar. 31, 2020

(54) GRILLE SHUTTER ATTACHING STRUCTURE OF AUTOMOTIVE VEHICLE

(71) Applicant: MAZDA MOTOR CORPORATION, Hiroshima (JP)

(72) Inventors: Shunsuke Fujitani, Hiroshima (JP); Daisuke Sakagami, Hiroshima (JP); Haruo Etchu, Hiroshima (JP); Nobuyuki Nakayama, Aki-gun (JP); Yuhki Takanaga, Aki-gun (JP); Takeshi Yamada, Hiroshima (JP); Masahide Kanemori, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 78 days.

(21) Appl. No.: 15/969,810

(22) Filed: May 3, 2018

(65) Prior Publication Data

US 2019/0001809 A1 Jan. 3, 2019

(30) Foreign Application Priority Data

Jun. 30, 2017 (JP) ................................ 2017-128574

(51) Int. Cl.
*B60K 11/08* (2006.01)
*B60R 19/52* (2006.01)

(52) U.S. Cl.
CPC ............ *B60K 11/085* (2013.01); *B60R 19/52* (2013.01); *B60R 2019/525* (2013.01)

(58) Field of Classification Search
CPC .. B60K 11/085; B60R 19/52; B60R 2019/525

USPC ...................... 296/193.1, 180.5, 193.11, 208
See application file for complete search history.

(56) References Cited

U.S. PATENT DOCUMENTS

| | | | | |
|---|---|---|---|---|
| 2,174,358 A | * | 9/1939 | Blumenthal | B60K 11/085 165/98 |
| 6,854,544 B2 | * | 2/2005 | Vide | B60K 11/085 180/68.1 |
| 9,333,850 B2 | * | 5/2016 | Ruppert | B60R 19/52 |
| 2008/0133090 A1 | * | 6/2008 | Browne | B60K 11/085 701/49 |
| 2010/0243352 A1 | * | 9/2010 | Watanabe | B60K 11/085 180/68.1 |
| 2011/0005851 A1 | * | 1/2011 | Doroghazi | B60K 11/085 180/68.1 |
| 2011/0097984 A1 | * | 4/2011 | Hasegawa | B60K 11/085 454/152 |
| 2012/0019025 A1 | | 1/2012 | Evans et al. | |

(Continued)

FOREIGN PATENT DOCUMENTS

JP 2014-198509 A 10/2014

*Primary Examiner* — Jason S Morrow
*Assistant Examiner* — E Turner Hicks
(74) *Attorney, Agent, or Firm* — Studebaker & Brackett PC

(57) ABSTRACT

A grille shutter unit which is provided with plural shutters extending in a vehicle width direction is attached to a frame-shaped shroud, a center stay is provided to extend in a vertical direction and connect a central portion, in a width direction, of a shroud upper and a central portion, in the width direction, of a shroud lower, the grille shutter unit is attached to a back-face side of the shroud, and an actuator (driving actuator) for opening/closing the shutters is arranged at a back-face side of the center stay.

3 Claims, 14 Drawing Sheets

(56) References Cited

U.S. PATENT DOCUMENTS

| | | | | |
|---|---|---|---|---|
| 2012/0110909 A1* | 5/2012 | Crane | ................. | B60K 11/085 49/70 |
| 2012/0132474 A1* | 5/2012 | Charnesky | ........... | B60K 11/085 180/68.1 |
| 2016/0368367 A1* | 12/2016 | Schoning | ................ | B60R 19/48 |
| 2017/0043659 A1* | 2/2017 | Vacca | .................... | B60K 11/08 |

* cited by examiner

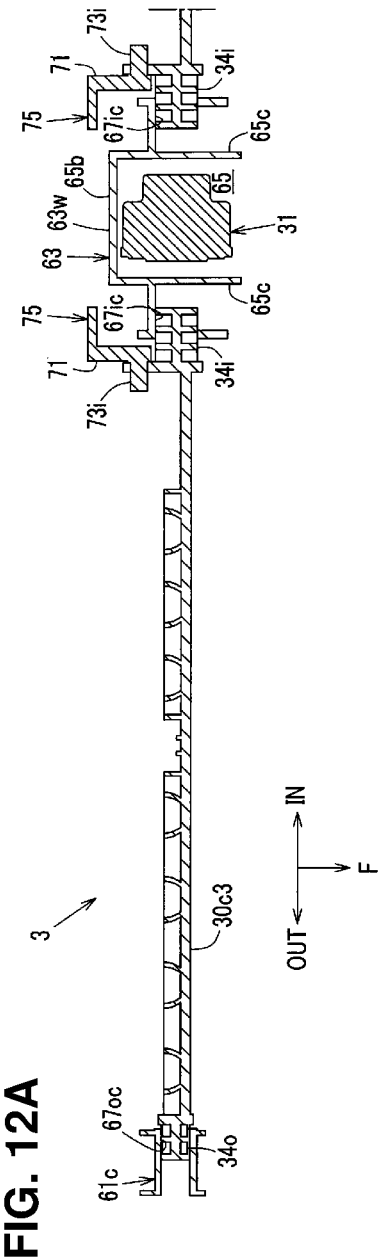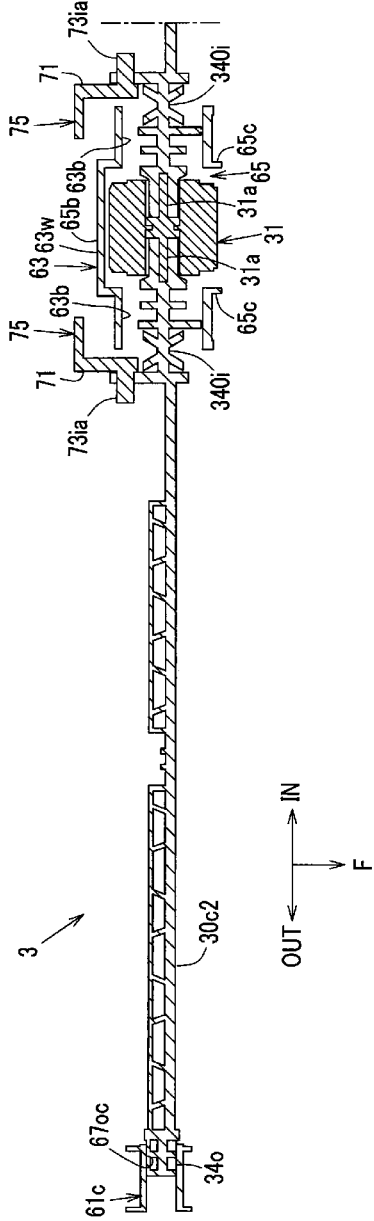

FIG. 14A  FIG. 14B
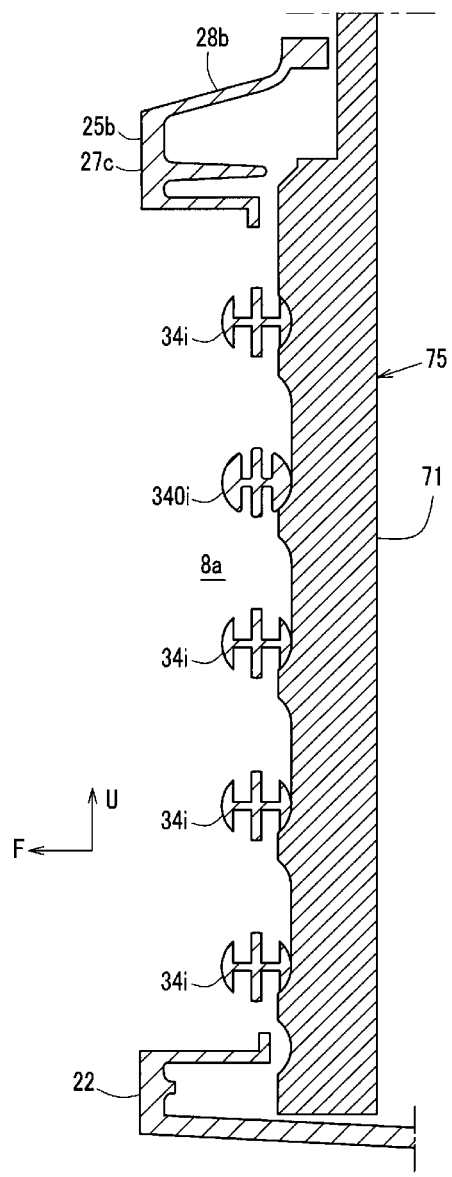
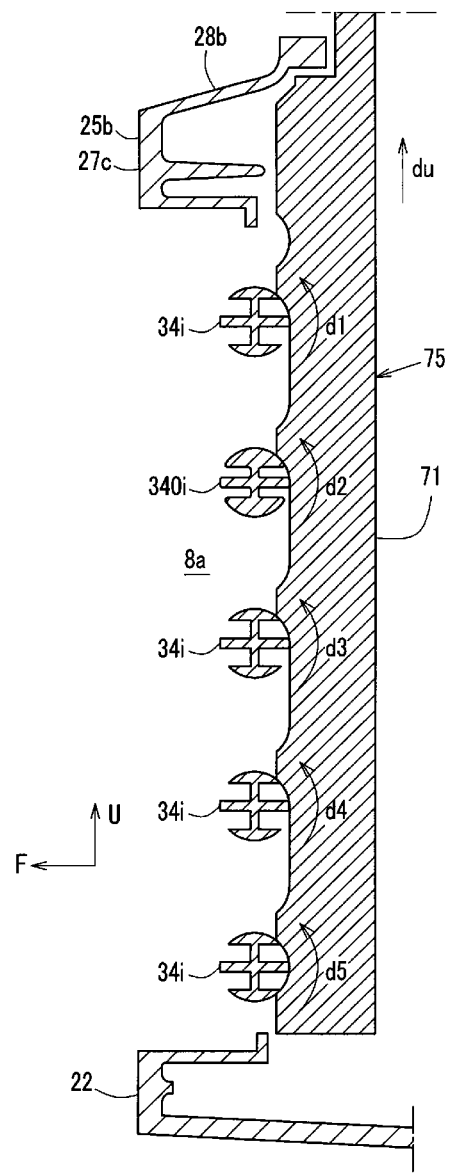

GRILLE SHUTTER ATTACHING STRUCTURE OF AUTOMOTIVE VEHICLE

BACKGROUND OF THE INVENTION

The present invention relates to a grille shutter attaching structure of an automotive vehicle in which a grille shutter unit provided with plural shutters extending in a vehicle width direction is attached to a frame-shaped shroud.

As exemplified in Japanese Patent Laid-Open Publication No. 2014-198509, it is known that the grille shutter attaching structure of the automotive vehicle comprises a driving actuator for opening/closing the shutters which is arranged to control introduction of air to a radiator according to a driving state of the vehicle.

An opening/closing driving means (36) including the actuator disclosed in the above-described patent document is provided at one (43) of side wall portions (43, 44) which are arranged on both sides of a unit frame (31) of a grille shutter unit (30) (see FIGS. 9 and 11 in the above-described patent document).

In the above-described structure comprising the opening/closing driving means (36) being provided at the side wall portion (43) of the grille shutter unit (30), however, since the opening/closing driving means (36) is attached to an attaching flange (46) which protrudes outward, in a vehicle width direction, beyond the side wall portion (43) (see the same figures in the above-described patent document), there is a concern that the opening/closing driving means (36) protruding outward beyond the side wall portion (43) may interfere with an auxiliary parts, such as a sensor or an air induction member, which exists around the side wall portion (43). Moreover, in a case where the opening/closing driving means (36) is arranged on an inward side, in the vehicle width direction, of the side wall portion (43), there is a concern that the opening/closing driving means (36) may partially close an opening of a shroud member (20), so that an opening area may be improperly small. Thus, there is room for improvement because the structure comprising the opening/closing driving means (36) tends to receive restrictions in layout.

SUMMARY OF THE INVENTION

Accordingly, an object of the present invention is to provide a grille shutter attaching structure of an automotive vehicle which can secure the layout performance even in the structure comprising the actuator for opening/closing the shutters.

The present invention is a grille shutter attaching structure of an automotive vehicle, comprising a frame-shaped shroud, a grille shutter unit provided with plural shutters extending in a vehicle width direction, and a center stay provided to extend in a vertical direction and connect a central portion, in a width direction, of a shroud upper of the shroud and a central portion, in the width direction, of a shroud lower of the shroud, wherein the grille shutter unit is attached to a back-face side of the shroud, and a driving actuator for opening/closing the shutters is arranged at a back-face side of the center stay of the grille shutter unit.

According to the present invention, the actuator can be arranged by utilizing a dead space which is created at the back-face side of the center stay, thereby improving the layout performance.

In an embodiment of the present invention, the center stay is configured such that a lower part thereof is wider than an upper part thereof, and the driving actuator is arranged at a back-face side of the lower part of the center stay.

According to this embodiment, the position of a gravity center of the grille shutter unit comprising the actuator can be properly lowered, improving the rigidity of a connection portion of the central portion, in the width direction, of the shroud lower and the center stay.

In another embodiment of the present invention, a center frame which is provided at the grille shutter unit is attached to the back-face side of the center stay along the center stay, an actuator arrangement part, in the vertical direction, of the center frame where the driving actuator is arranged is configured to be wider than the other part of the center frame, and an actuator housing portion where the driving actuator is housed is formed at the actuator arrangement part.

According to this embodiment, since the actuator arrangement part, in the vertical direction, of the center frame is configured to be wide according to the width of the center stay, the actuator housing portion where the driving actuator is housed can be properly formed at the actuator arrangement part.

In another embodiment of the present invention, a driving link which transmits a driving force of the driving actuator to the shutters is arranged along the center frame.

According to this embodiment, since the driving link is arranged at the center, in the vehicle width direction, of the grille shutter unit (because of so-called center arrangement), the shutters can be driven smoothly by the driving link.

In another embodiment of the present invention, the grille shutter unit is provided with right-and-left split side units which are provided on right-and-left both sides of the center frame, the driving link comprises right-and-left driving links which are provided at respective end portions of the right-and-left split side units which are positioned on a center-frame side in the vehicle width direction, and the right-and-left driving links are interconnected on a back-face side of the center frame.

According to this embodiment, the rigidity of the driving link can be improved, so that the shutter opening/closing driving can be smooth without causing asynchronous opening/closing between the both-side shutters which are arranged on the right-and-left sides of the center frame.

In another embodiment of the present invention, a latch housing portion where a latch of a bonnet (an engine hood) is housed is provided at the central portion, in the width direction, of the shroud upper such that the latch housing portion protrudes toward an opening portion which is formed at an inside, in an elevational view, of the frame-shaped shroud, right-and-left indirect swing shutters which are not driven directly by the driving link are provided on right-and-left both sides of the latch housing portion, and a second driving link which is different from the driving link is provided on an outward side, in the vehicle width direction, of the indirect swing shutters so as to drive the indirect swing shutters According to this embodiment, even in the structure where the indirect swing shutters which are not driven directly by the driving link are arranged on the right-and-left both sides of the latch housing portion in accordance with forming the latch housing portion, the indirect swing shutters can be smoothly driven by the second driving link.

In another embodiment of the present invention, the center frame is attached such that the center frame connects the central portion, in the width direction, of the shroud upper and the central portion, in the width direction, of the shroud lower, being configured to be integrated with the center stay.

According to this embodiment, the center stay can secure the rigidity, in the vertical direction, of the shroud together with the center frame. Further, since a lower part of the center frame which houses the actuator as a weight object is configured to be wide similarly to the center stay, the high rigidity can be secured, and since an upper part of the center frame is integrated with the center stay, its width can be made as narrow as possible, so that the sufficiently large opening portion can be secured.

Other features, aspects, and advantages of the present invention will become apparent from the following description which refers to the accompanying drawings.

BRIEF DESCRIPTION OF THE DRAWINGS

FIG. 12A is a sectional view of a major part, taken along line F-F of FIG. 3, and FIG. 12B is a sectional view of the major part, taken along line G-G of FIG. 3.

FIG. 14A is a sectional view of a major part, taken along line I-I of FIG. 2, in a state where the shutters are open, and FIG. 14B is a sectional view of the major part, taken along line I-I of FIG. 2, in a state where the shutters are closed.

DETAILED DESCRIPTION OF THE INVENTION

Figure 1:
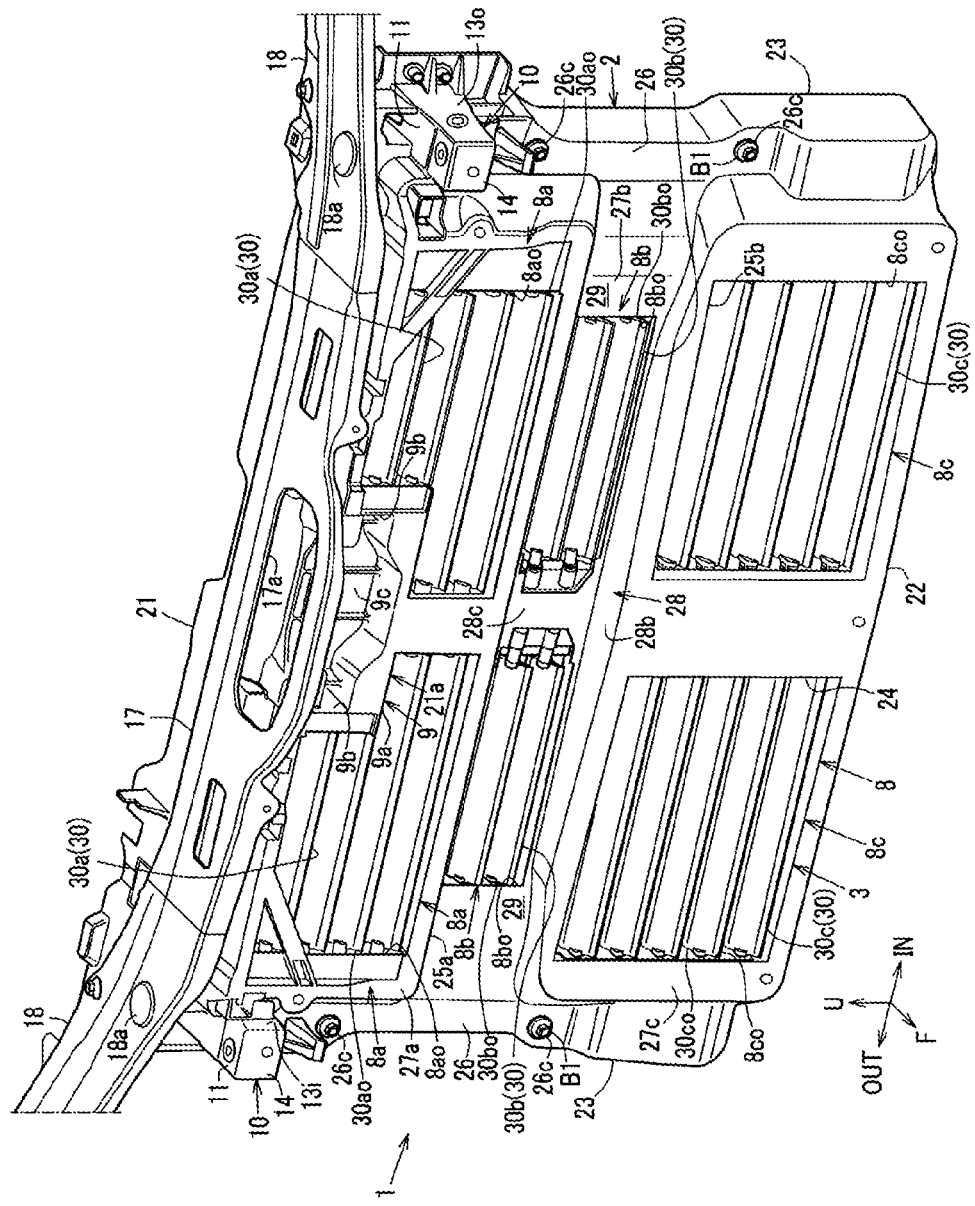
FIG. 1 is a perspective view of a grille shutter attaching structure of an embodiment of the present invention, when viewed from a forward side.

Hereafter, an embodiment of the present invention will be described specifically referring to the drawings. In the figures, an arrow F shows a forward side of a vehicle, an arrow OUT shows an outward side, in a vehicle width direction, of the vehicle (vehicle rightward side), an arrow IN shows an inward side, in the vehicle width direction, of the vehicle (vehicle leftward side), and an arrow U shows an upward side of the vehicle.

Figure 2:
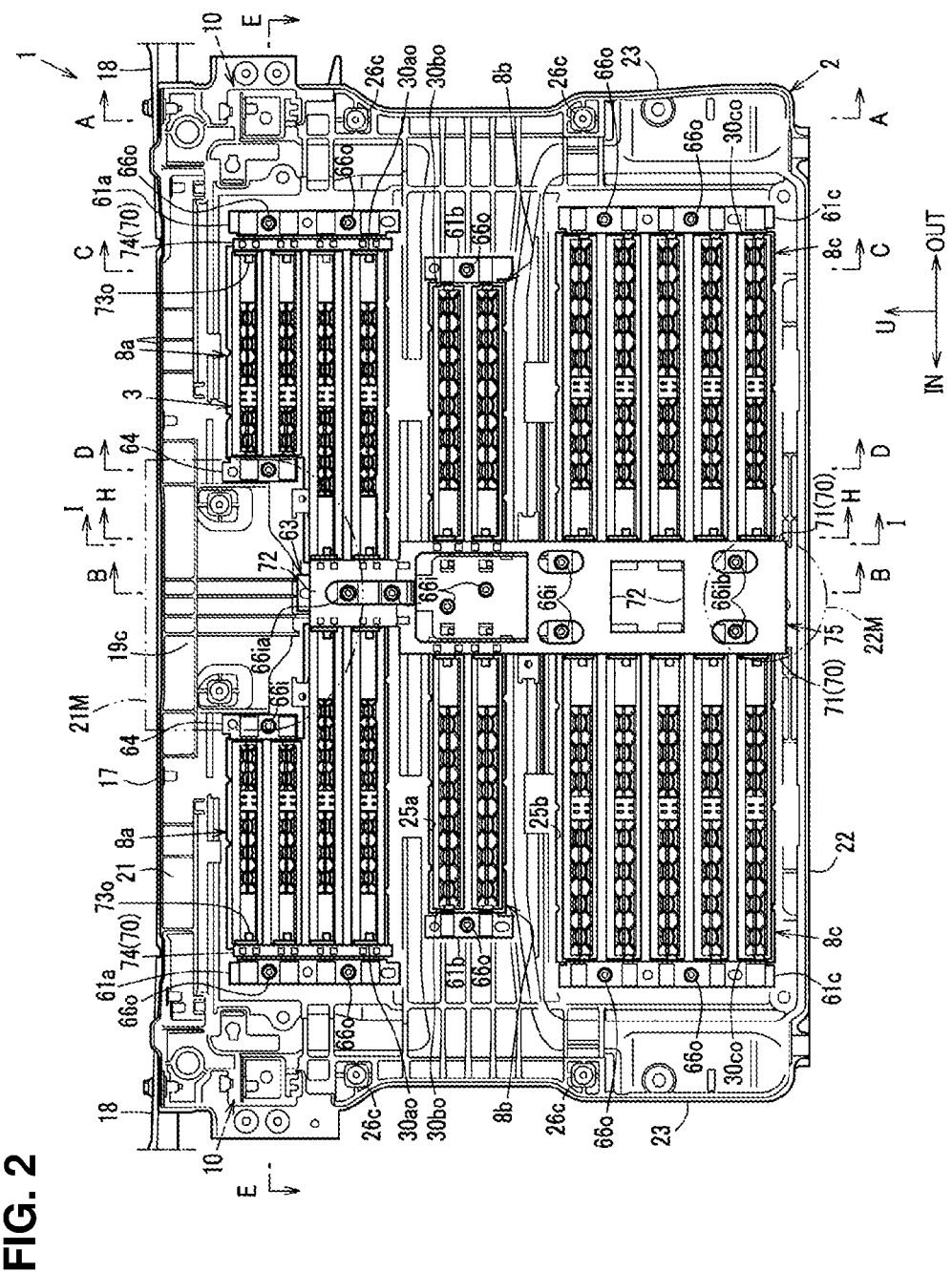
FIG. 2 is a back view of the grille shutter attaching structure of the present embodiment in a state where a radiator and a condenser are detached.
Figure 3:
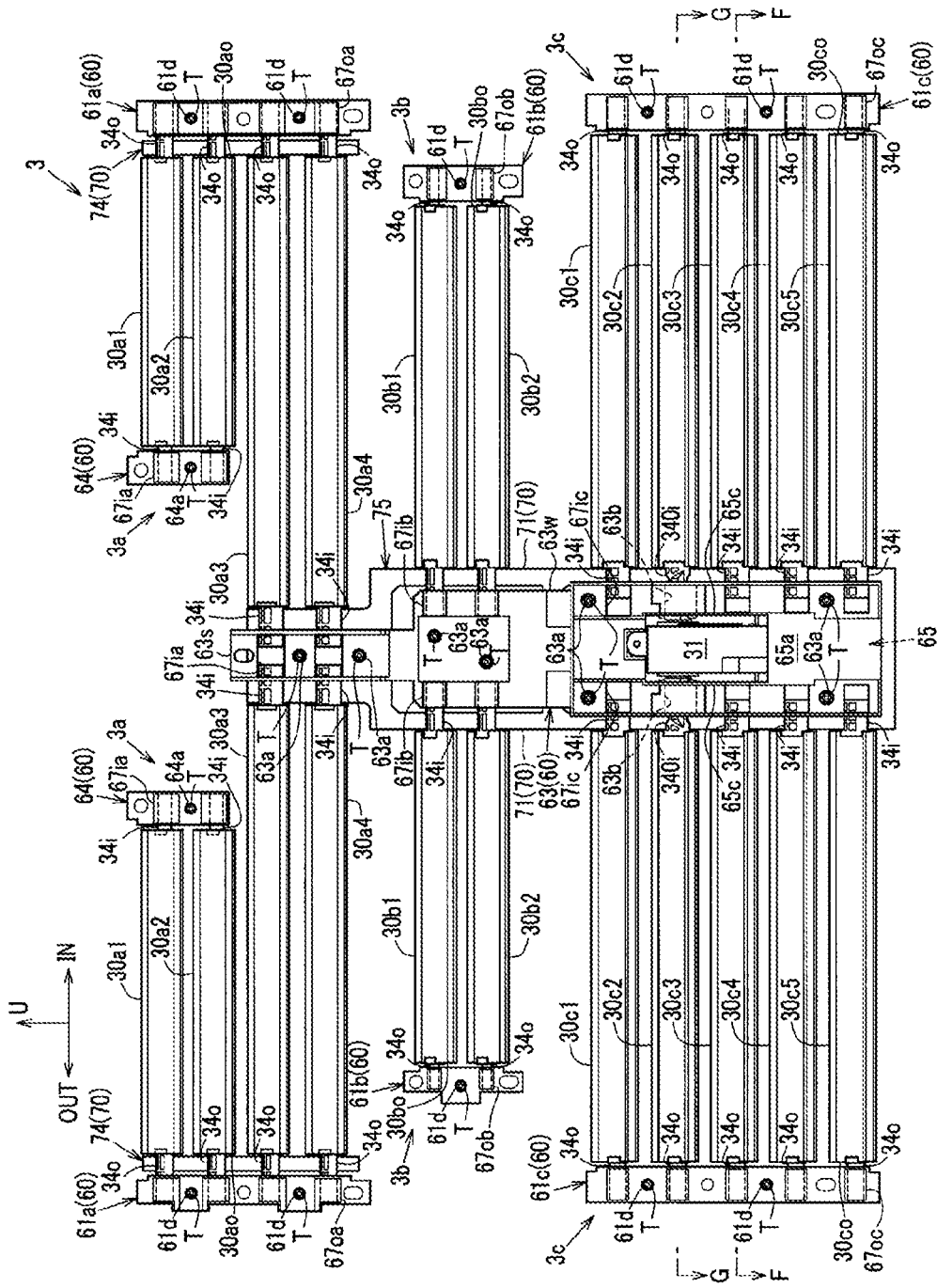
FIG. 3 is an elevational view of a grille shutter unit of the present embodiment.

As shown in FIGS. 1-3, a grille shutter attaching structure 1 of an automotive vehicle of the present embodiment comprises a rectangular frame-shaped shroud 2 and a grille shutter unit 3 which is fixed to the shroud 2. Herein, since the shroud 2 and the grille shutter unit 3 of the present embodiment are respectively configured to be substantially symmetrical, a right-side part of the grille shutter attaching structure 1 will be described.

The shroud 2 is configured in a rectangular frame shape to hold a radiator 4 and a condenser 45 as heat exchangers (see FIGS. 8-11) and introduce traveling air flowing down from the vehicle forward side toward the radiator 4.

Figure 4:
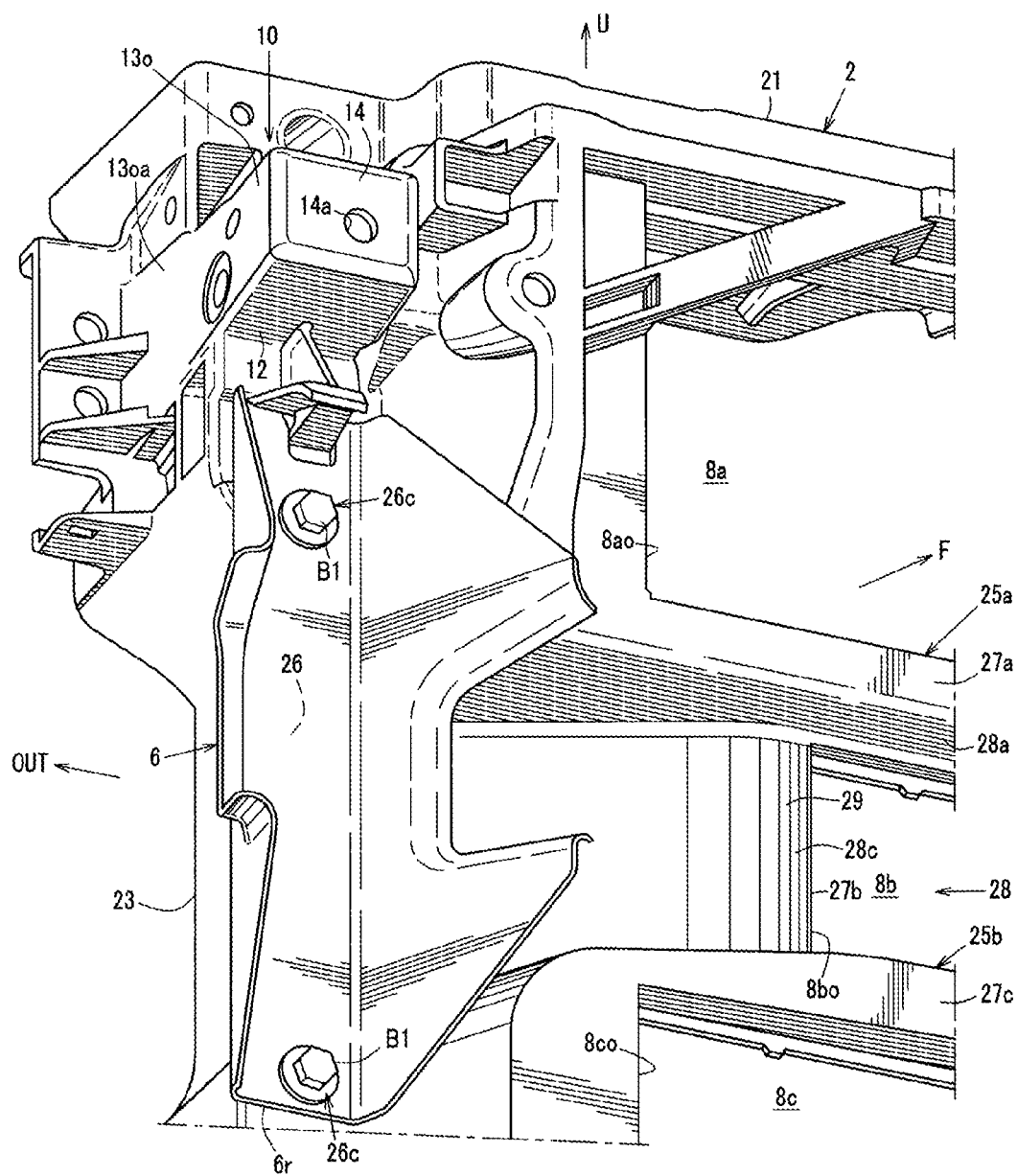
FIG. 4 is a perspective view showing an upper portion and a central portion, in a vertical direction, of a right side of a shroud of the present embodiment.
Figure 6A:
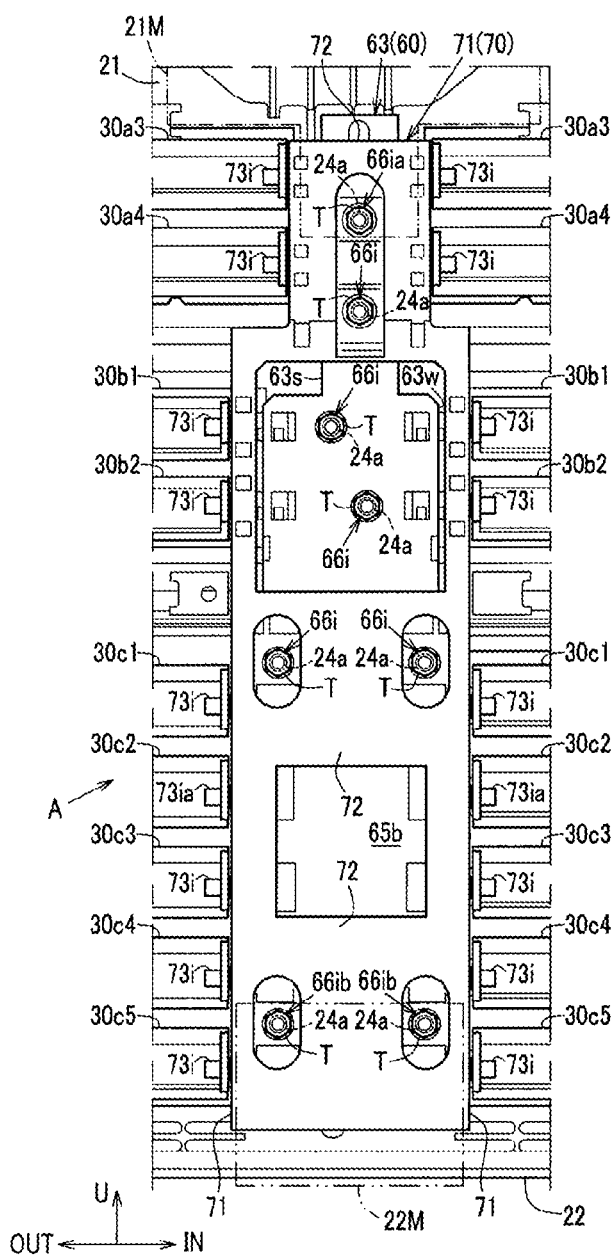
FIG. 6A is an enlarged view of a major part of a first center frame and its surrounding portion of FIG. 2.
Figure 6B:
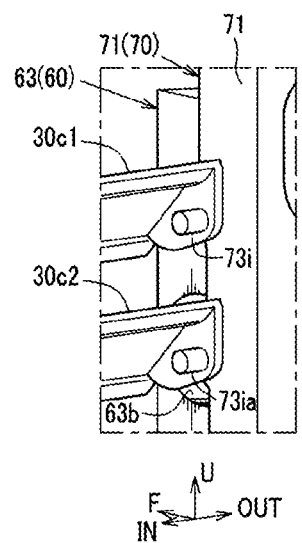
FIG. 6B is an enlarged perspective view showing the major part, when viewed from an arrow A in FIG. 6A and a paper front side.
Figure 7:
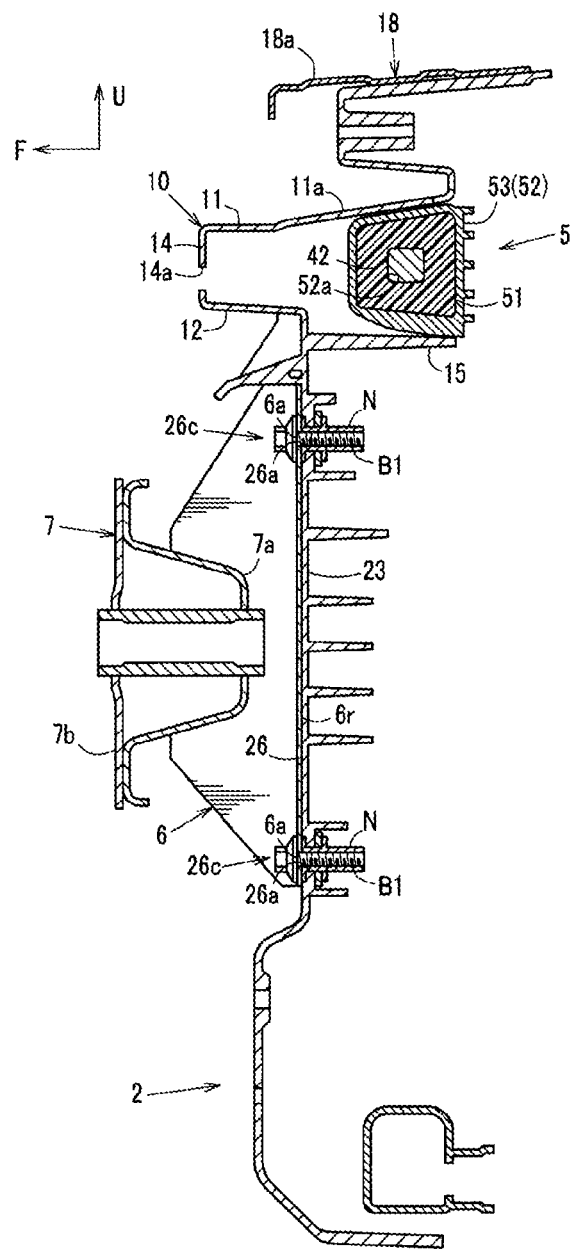
FIG. 7 is a sectional view taken along line A-A of FIG. 2.

As shown in FIGS. 4-9, in particular FIGS. 4 and 7, a pair of bumper beam attaching brackets 6 (hereafter, referred to as the "brackets 6") are attached to right-and-left both sides of the shroud 2, and the shroud 2 is connected to a bumper beam 7 via the brackets 6. Illustration of the brackets 6 and the bumper beam 7 is omitted in FIG. 1, and illustration of the bumper beam 7 is omitted in FIG. 4.

The bumper beam 7 comprises a base plate 7a which has a hat-shaped cross section and a closing plate 7b which is of a plate shape as shown in FIGS. 7-10, and extends in the vehicle width direction. The bumper beam 7 is attached to front ends of a pair of front side frames which extend in a longitudinal direction on right-and-left both sides of an engine room via attaching plates and crash cans, which are not illustrated. The shroud 2 is arranged in a roughly vertical position at a location which is positioned behind the bumper beam 7 and between a pair of right-and-left crash cans (not illustrated).

As shown in FIGS. 1 and 2, the shroud 2 comprises a shroud upper 21 which extends in the vehicle width direction and forms an upper side of its rectangular frame shape, a shroud lower 22 which forms a lower side of its rectangular frame shape, a pair of right-and-left shroud sides 23, 23 which form right-and-left sides of its rectangular frame shape and connect right-and-left both ends of the shroud upper 21 and the shroud lower 22 in the vertical direction, and has a rectangular opening portion 8 (8a, 8b, 8c) which penetrates in the longitudinal direction at an inside, in an elevational view, thereof.

Figure 8:
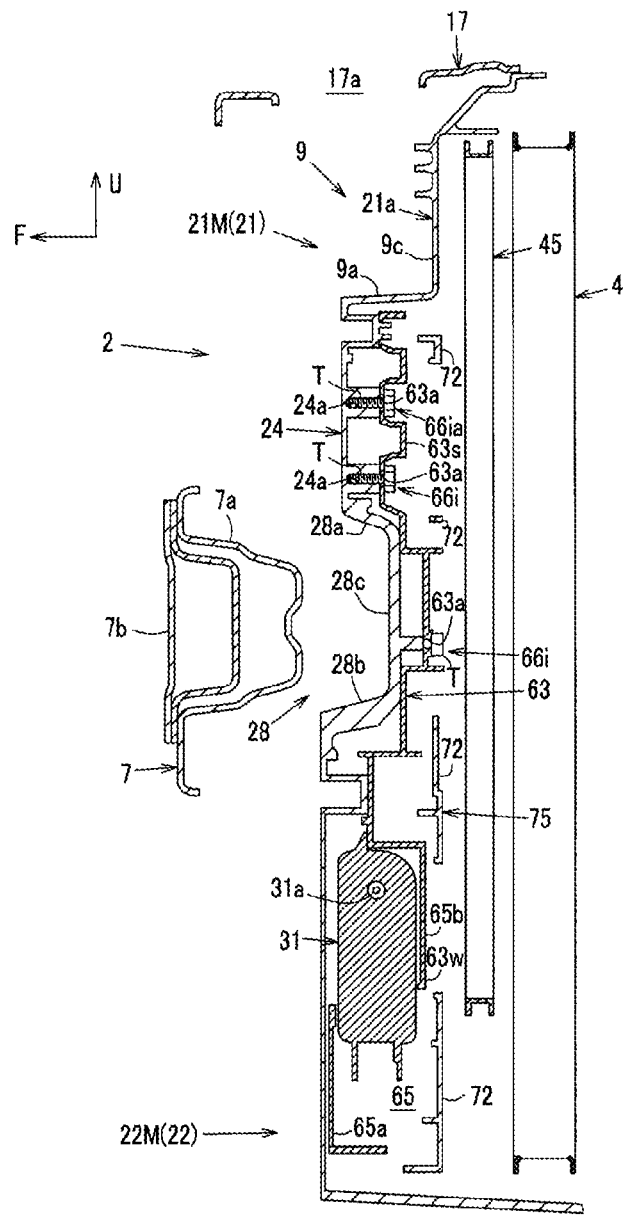
FIG. 8 is a sectional view taken along line B-B of FIG. 2.
Figure 9:
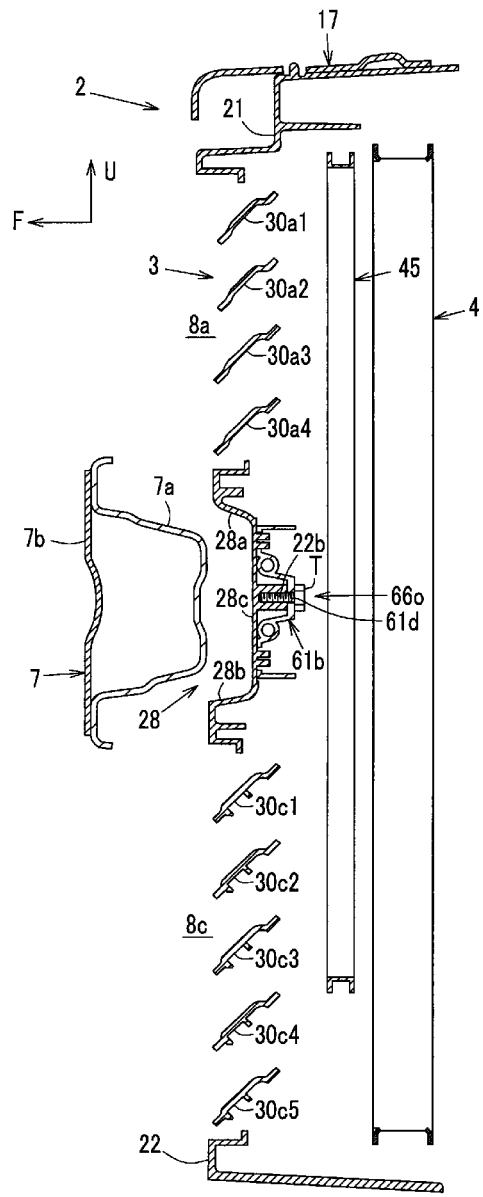
FIG. 9 is a sectional view taken along line C-C of FIG. 2.

As shown in FIGS. 1 and 8, a center stay 24 which is provided to extend in the vertical direction and connect a forward side of a central portion, in a width direction, of the shroud upper 21 (hereafter, referred to as a "upper-side width-directional center 21M of the shroud 2") and a forward side of a central portion, in the width direction, of the shroud lower 22 (hereafter, referred to as a "lower-side width-directional center 22M of the shroud 2") is formed integrally at the shroud 2.

Further, cross stays 25a, 25b (an upper-side cross stay 25a and a lower-side cross stay 25b) which extend in the vehicle width direction and connect respective forward sides of upper-and-lower portions of the pair of right-and-left shroud sides 23, 23 are formed integrally at the shroud 2.

As shown in FIGS. 1 and 2, the opening portion 8 is partitioned, by the center stay 24 and the cross stays 25a, 25b, into six parts. Specifically, the opening portion 8 is partitioned into right-and-left upper-level opening portions 8a, 8a at a position located above the upper-side cross stay 25a, partitioned into right-and-left middle-level opening portions 8b, 8b at a position located between the upper-side cross stay 25a and the lower-side cross stay 25b, and partitioned into right-and-left lower-level opening portions 8c, 8c at a position located below the lower-side cross stay 25b.

As shown in FIGS. 1 and 4, an outward edge 8bo, in the vehicle width direction, of the middle-level opening portion 8b is positioned on an inward side, in the vehicle width direction, of respective outward edges 8ao, 8co, in the vehicle width direction, of the upper-level opening portion 8a and the lower-level opening portion 8c. Accordingly, a wide portion 29 which protrudes toward the middle-level opening portion 8b is formed at a portion, in the vertical direction, of the shroud side 23 which is located on the inward side, in the vehicle width direction, of an attachment position 26 (a bracket attaching-face portion 26, which will be described later) of the bracket 6 (see FIGS. 1 and 4).

As shown in FIG. 1, the center stay 24 is configured such that its lower part is wider than its upper part. Specifically, a portion of the center stay 24 which corresponds to the lower-level opening portion 8c in the vertical direction is wider than respective portions of the center stay 24 which correspond to the middle-level opening portion 8b and the upper-level opening portion 8a in the vertical direction.

As shown in FIGS. 1, 4 and 7, the bracket attaching-face portion 26 is formed at a front face of a central portion, in the vertical direction, of the shroud side 23, where a rear face portion 6r of the bracket 6 (see FIGS. 4 and 7) is fastened.

Specifically, as shown in FIG. 7, insertion holes 26a for bolts B1 to be inserted therethrough are formed at upper and lower portions of the bracket attaching-face portion 26, and penetration (through) holes 6a are formed at the rear face portion 6r of the bracket 6 at respective positions which correspond to the insertion holes 26a. Collar nuts N are previously inserted into the upper-and-lower insertion holes 26a, 26a. Fastening portions 26c are constituted by inserting the bolts B1 into the penetration holes 6a and the collar nuts N inserted into the insertion holes 26a from the vehicle forward side, whereby the bracket 6 is fixedly fastened to the bracket attaching-face portion 26.

As shown in FIGS. 1 and 4, a front face of the shroud 2 is configured such that respective peripheral edges 27a, 27c of the upper-level opening portion 8a and the lower-level opening portion 8c protrude forward relative to a peripheral edge 27b of the middle-level opening portion 8b.

As shown in FIGS. 1, 4, 8-10, a housing recess portion 28 for housing a rear portion of the bumper beam 7 is formed at a central portion, in the vertical direction, of the front face of the shroud 2 which is located on the inward side, in the vehicle width direction, of the pair of right-and-left bracket attaching-face portions 26, 26. The housing recess portion 28 of the present embodiment comprises a recess-portion upper wall 28a which slants such that its front side is positioned at a higher level than its rear side, a recess-portion lower wall 28b which slants such that its front side is positioned at a lower level than its rear side, and a recess-portion rear wall 28c which vertically connects respective rear ends of these walls 28a, 28b, whereby the housing recess portion 28 is configured in a recess shape such that its forward side opens. The recess-portion upper wall 28a is formed at the upper-side cross stay 25a, the recess-portion lower wall 28b is formed at the lower-side cross stay 25b, and the middle-level opening portion 8b is formed at the recess-portion rear wall 28c.

Figure 11:
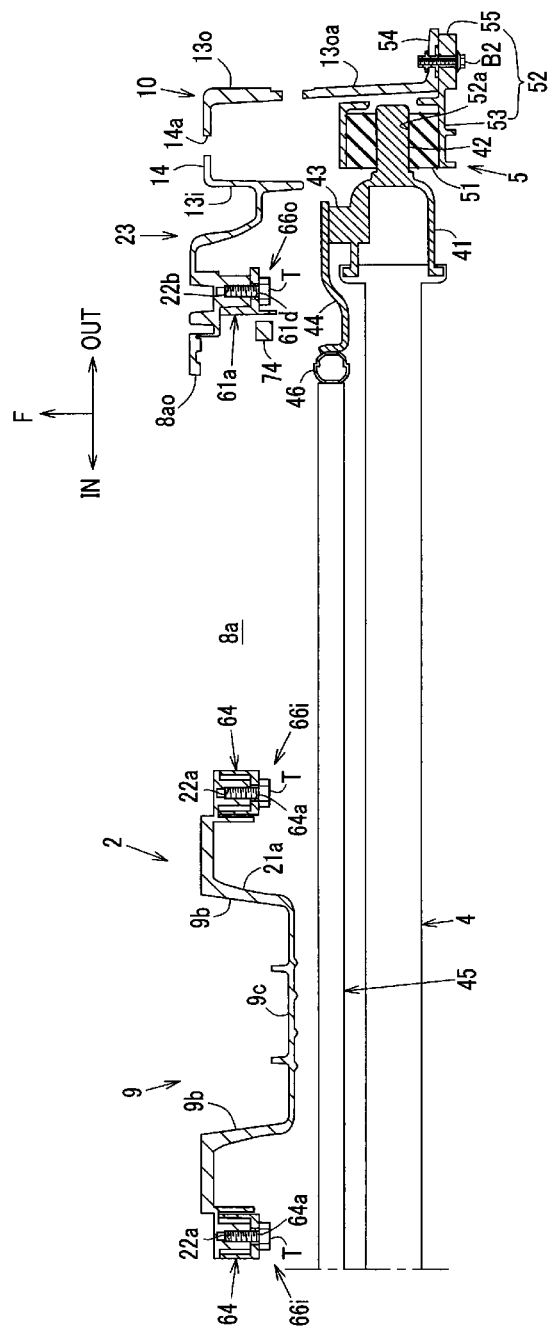
FIG. 11 is a sectional view of a major part, taken along line E-E of FIG. 2.

Herein, as shown in FIG. 11, a reservoir tank 41 is formed integrally with an outward portion, in the vehicle width direction, of the radiator 4, and a rod-shaped protrusion portion 42 which protrudes outward from the reservoir tank 41 is provided. The protrusion portion 42 is configured to have a square-shaped cross section (see FIG. 7).

As shown in FIG. 11, a support piece 43 for supporting the condenser 45 is integrally formed with a front portion of the reservoir tank 41 of the radiator 4. A reservoir tank 46 is integrally formed with at the outward side, in the vehicle width direction, of the condenser 45 as well, and an outward side, in the vehicle width direction, of the reservoir tank 46 and the above-described support piece 43 are connected by a bracket 44.

As shown in FIGS. 7 and 11, the radiator 4 is supported by mount devices 5, 5 which are arranged at positions near upper ends of the pair of right-and-left shroud sides 23, 23. The mount devices 5, 5 support right-and-left protrusion portions 42, and each mount device 5 comprises a mount rubber 51 which is a resilient member, such as a rubber, and a support bracket 52 which holds the mount rubber 51 and attaches this mount rubber 51 to the shroud side 23. A hole portion 52a, which has a square-shaped cross section and into which the protrusion portion 42 is fitted, is formed at a central portion of the mount rubber 51.

As shown in FIG. 11, the support bracket 52 comprises a tubal-shaped hold portion 53 which holds the protrusion portion 42 via the mount rubber 51 and an attaching piece 55 which extends outward from a rear portion of the hold portion 53 and is attached, from the rearward side, to a rear-end flange portion 54 which extends from a rear end of the shroud side 23 to an outward end, in the vehicle width direction, of the shroud side 23 by fastening means of a bolt B2 and others, which are formed integrally.

In the mount devices 5 of the right-and-left shroud sides 23, the radiator 4 and the condenser 45 are supported at right-and-left both sides of the shroud 2 via the two mount devices 5 by the right-and-left protrusion potions 42 being holed.

As shown in FIGS. 7 and 11, a boxy-shaped portion 10 which protrudes in a boxy shape (squarely-cylindrical shape) from the front face of the shroud side 23 is integrally formed with a portion of the shroud side 23 which corresponds to the mount device 5 in the vertical direction.

As shown in FIGS. 4, 7 and 11, the boxy-shaped portion 10 is formed in the squarely-cylindrical shape by an upper wall portion 11, a lower portion 12, and both side wall portions 13o, 13i, which are further integrally formed with a front wall portion 14 which covers a front end of an inside space of the upper wall portion 11, the lower wall portion 12, and the side wall portions 13o, 13i. At the front wall portion 14 is provided an attachment hole 14a for attaching a protector of an airbag sensor, not illustrated (see FIGS. 4 and 11).

As shown in FIGS. 4, 7 and 11, the upper wall portion 11 and the outward-side side wall portion 13o protrude rearward beyond the bracket attaching-face portion 26 (see FIG. 4) of the shroud side 23, and a rib 15 (see FIG. 7) which protrudes rearward beyond the bracket attaching-face portion 26 is integrally formed at a position located slightly below a rear end of the lower wall portion 12.

Respective protrusion portions 11a, 13oa of the upper wall portion 11 and the outward-side side wall portion 13c and the rib 15 are configured as a base portion of the above-described boxy-shaped portion 10 (see FIGS. 4, 7 and 11).

The tubal-shaped hold portion 53 of the support bracket 52 is provided to be fit into a space of the base portion of the boxy-shaped portion 10 (see FIG. 7), whereby the boxy-shaped portion 10 is also configured as a reinforcing portion to reinforce the support rigidity of the radiator 4 and the condenser 45 by the mount device 5.

As shown in FIG. 1, the shroud 2 includes a shroud upper member 17 which is attached to an upper face of the shroud upper 21 and the shroud side members 18, 18 which are provided at right-and-left both sides of the shroud upper member 17. In FIG. 4, illustration of the shroud upper member 17 and the shroud side member 18 is omitted.

The shroud upper member 17 is connected to front end portions of apron members, not illustrated, via the shroud side members 18, 18 at its both sides. The rectangular-frame shaped body portion (the shroud upper 21, the shroud lower 22, and the both-side shroud sides 23, 23) is made of a hard plastic material, whereas the shroud upper member 17 and the shroud side members 18, 18 are made of a steel plate.

A pedestal (seat) portion 18a where a stopper rubber, not illustrated, which is a shock absorbing member to absorb closing shock (closing impact) of a bonnet (engine hood), is placed is provided at an inward side of the upper face of each of the shroud side members 18, 18, specifically at a portion of the shroud side member 18 which corresponds to the shroud side 23 in the vehicle width direction (see FIG. 1).

Further, at a central portion, in the vehicle width direction, of the shroud upper member 17 is formed a penetration hole 17a through which a striker (not illustrated) provided at the bonnet passes.

As shown in FIG. 1, a downward extension portion 21a is integrally formed at a front side of a central portion, in the vehicle width direction, of the shroud upper 21 which is positioned below the penetration hole 17a of the shroud upper member 17 such that the downward extension portion 21a extends downward from a lower face of the shroud upper 21 and protrudes toward the right-and-left both-side upper-level opening portions 8a, 8a.

A latch housing portion 9 (pocket portion) which houses a latch, not illustrated, is provided at the front side of the central portion, in the vehicle width direction, of the shroud upper 21 including the above-described downward extension portion 21a. As shown in FIGS. 1 and 8, this latch housing portion 9 comprises a lower wall portion 9a, right-and-left both-side side wall portions 9b, 9b, and a rear wall portion 9c such that the latch housing portion 9 is configured in a recess shape (pocket shape) which opens forward and upward.

Thereby, the bonnet is configured to engage with a vehicle body when the striker provided at the bonnet engages with the latch housed in the latch housing portion 9, passing through the penetration hole 17a, when the bonnet is closed.

As shown in FIGS. 1 and 8, an upper end of the center stay 24 is integrally connected to a central portion, in the vehicle width direction, of the lower wall portion 9a of the latch housing portion 9, and the latch housing portion 9 is configured to be wider than the center stay 24 (at least an upper portion of the center stay 24) (see FIG. 1).

Next, the grille shutter unit 3 will be described. As shown in FIGS. 1, 2, 8-11, the grille shutter unit 3 of the present embodiment is attached to the shroud 2 such that it does not protrude beyond the shroud 2 in the elevational view from its back-face side and a forward side of the radiator 4 and the condenser 45.

As shown in FIG. 3, the grille shutter unit 3 which comprises plural (six, in the present embodiment) split units 3a-3c, i.e., upper-level units 3a, 3a, middle-level units 3b, 3b and lower-level units 3c, 3c, is configured to be substantially symmetrical.

The grille shutter unit 3 comprises plural shutters 30 which extend in the vehicle width direction, an actuator (driving actuator) 31 (see FIGS. 3 and 8) which drives opening/closing (swinging) of the shutters 30, and a swing link 70 (71, 74) (see FIG. 2) which transmits a driving force of the actuator 31 to the shutters 30, and a frame 60 (61a, 61b, 61c, 63, 64) which is attached on the side of the shroud 2 and holds the shutters 30 and the swing link 70. The shutters 30, the swing link 70, and the frame 60 are provided at the split units 3a-3c as basic structural elements.

The plural shutters 30 are respectively arranged in the vertical direction for the split units 3a-3c. In the present embodiment, as shown in FIG. 3, four of the shutters are provided at the upper-level unit 3a, two of the shutters are provided at the middle-level unit 3b, and five of the shutters are provided at the lower-level unit 3c. Opening/closing of the upper-level, middle-level, lower-level opening portions 8a, 8b, 8c are respectively controlled by these shutters.

Herein, the four shutters 30 provided at the upper-level unit 3a are set as an upper-level shutter 30a as shown in FIG. 1, wherein first-fourth upper-level shutters 30a1-30a4 are set in order from the top as shown in FIG. 3. Likewise, the two shutters 30 provided at the middle-level unit 3b are set as a middle-level shutter 30b, wherein first, second middle-level shutters 30b1, 30b2 are set in order from the top. The five shutters 30 provided at the lower-level unit 3c are set as a lower-level shutter 30c, wherein first-fifth lower-level shutters 30c1-30c5 are set in order from the top.

Figure 10:
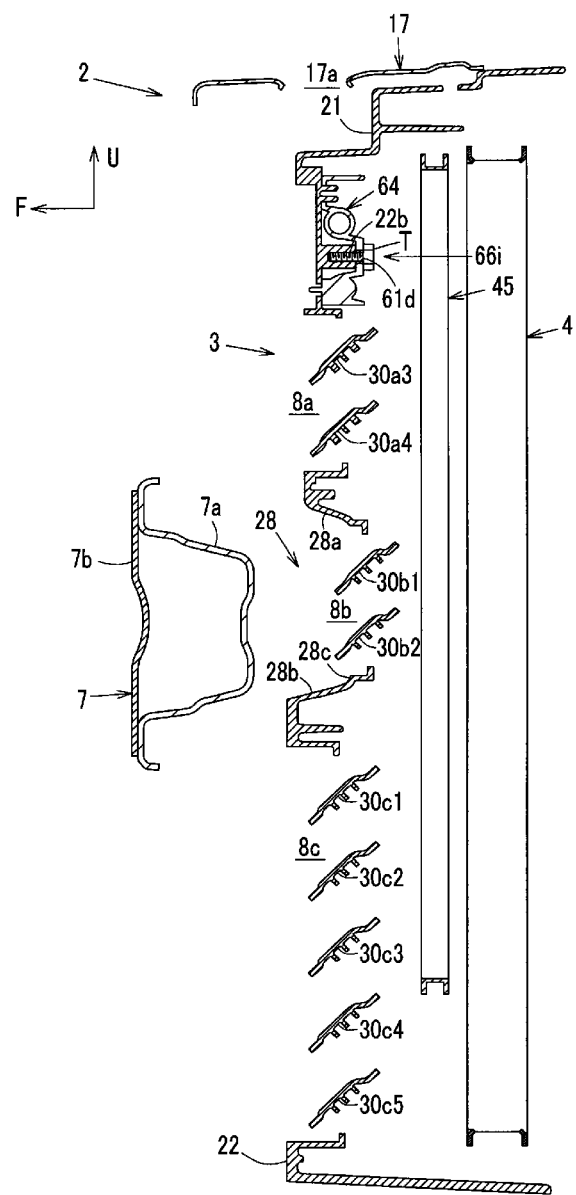
FIG. 10 is a sectional view taken along line D-D of FIG. 2.

Further, as shown in FIGS. 1 and 10, the upper-level shutter 30a and the lower-level shutter 30c are positioned slightly in front of the middle-level shutter 30b in accordance with the above-described structure in which the respective peripheral edges 27a, 27c of the upper-level opening portion 8a and the lower-level opening portion 8c protrude forward relative to the peripheral edge 27b of the middle-level opening portion 8b (see FIG. 1).

While the opening portion 8 of the shroud 2 is configured, as described above, such that the outward edge 8bo of the middle-level opening portion 8b is positioned on the inward side, in the vehicle width direction, of the outward edges 8ao, 8co of the upper-level opening portion 8a and the lower-level opening portion 8c (see FIGS. 1 and 4), the shutters 30 are configured accordingly, as shown in FIGS. 1-3, such that an outward edge 30bo of the middle-level shutter 30b is positioned on the inward side, in the vehicle width direction, of outward edges 30ao, 30co of the upper-level shutter 30a and the lower-level shutter 30c.

Accordingly, the respective shutters 30a, 30b, 30c provided at the upper-level, middle-level, and lower-level units 3a-3c are configured such that respective lengths, in the vehicle width direction, thereof are equal or slightly shorter than respective opening lengths, in the vehicle width direction, of the upper-level, middle-level, and lower-level opening portions 8a, 8b, 8c (see FIGS. 1 and 2).

Figure 5:
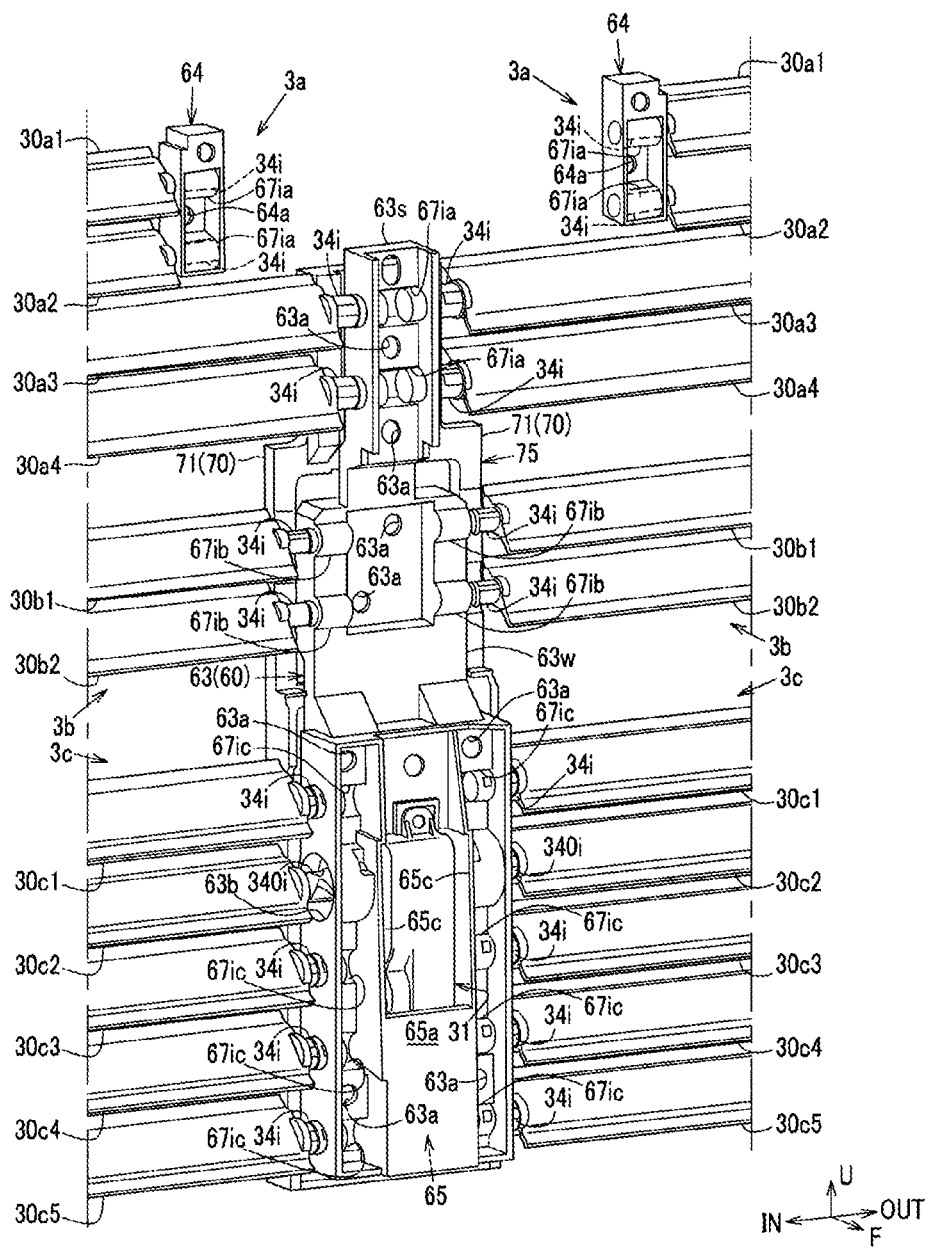
FIG. 5 is a perspective view of a central portion, in a vehicle width direction, of the grille shutter unit of the present embodiment, when viewed from the forward side.

As shown in FIG. 3, the shutters 30 comprise shutter shafts 34o which protrude outward from outward edges, in the vehicle width direction, thereof and shutter shafts 34i which protrude inward from inward edges, in the vehicle width direction, thereof, and these shutter shafts 34o, 34i extend coaxially in the vehicle width direction. As shown in FIGS. 2 and 3, the frame 60 comprises outer frames 61a, 61b, 61c which pivotally support the outward-side shutter shafts 34i of the shutters 30 and center frames 63, 64 which pivotally support the inward-side shutter shafts 34i of the shutters 30. As shown in FIGS. 2, 3 and 5, the center frames 63, 64 comprise the first center frame 63 and the second frames 64, 64 which are arranged above and on right-and-left both sides of the first center frame 63.

The first center frame 63 is provided as a common frame to all of the split units 3a-3c, and attached to a back face of the center stay 24 such that the first center frame 63 matches the center stay 24 in the vehicle width direction at the central portion, in the vehicle width direction, of the shroud 2 as shown in FIGS. 1, 2 and 8.

As shown in FIGS. 2, 3, 5 and 6A, the first center frame 63 extends in the vertical direction between an upper end and a lower end of the center stay 24, and comprises a lower-side wide portion 63w and a narrow portion 63s which is positioned above the wide portion 63w, corresponding to the center stay 24 (see FIG. 3).

As shown in FIGS. 3, 5 and 8, an actuator housing portion 65 which houses the actuator 31 is provided at a lower side of the first center frame 63. In the present embodiment, all of the shutters 30 provided at the grille shutter unit 3 are directly or indirectly driven by the single actuator 31 for opening/closing of the shutters 30.

The actuator housing portion 65 is provided at a portion of the wide portion 63w of the first center frame 63 which corresponds, in the vertical direction, to the lower-level opening portion 8c of the shroud 2, and the actuator 31 is housed in the actuator housing portion 65, so that the actuator 31 is arranged at a back-face side of the lower part of the center stay 24 (see FIG. 8).

Specifically, as shown in FIGS. 3, 5, 6A and 8, the actuator housing portion 65 comprises a front wall portion 65a which covers a lower part of the actuator 31 from the forward side at the first center frame 63, a rear wall portion 65b which covers a back-face side of an upper part of the actuator 31, and side wall portions 65c, 65c which cover both sides, in the vehicle width direction, of the actuator 31 (see FIG. 5).

Herein, as shown in FIG. 12B which is the sectional view of the major part, taken along line G-G of FIG. 3, at an upper part of the actuator 31 are provided motor shafts (drive shafts) 31a, 31a which protrude outward from its right-and-left both sides, and the actuator 31 is fixed to the first center frame 63 (see FIG. 8) such that the right-and-left motor shafts 31a, 31a match the shutter shaft 34i of the lower-level second shutter 30c2 (hereafter, referred to as "lower-level second shutter shaft 340i") in the side view, that is, the motor shafts 31a, 31a and the lower-level second shutter shaft 340i are coaxial (see FIG. 12B).

Further, as shown in FIGS. 2, 6A and 8, the above-described first center frame 63 is integrally attached to the center stay 24 such that the upper-side width-directional center 21M of the shroud 2 (i.e., the central portion, in the width direction, of the shroud upper 21) and the lower-side width-directional center 22M of the shroud 2 (i.e., the central portion, in the width direction, of the shroud lower 22) are interconnected by these two. Accordingly, the center stay 24 can secure the rigidity, in the vertical direction, of the shroud 2 together with the first center frame 63. Further, since the lower part of the first center frame 63 which houses the actuator 31 as a weight object is configured to be wide similarly to the center stay 24, the high rigidity can be secured, and since the upper part of the first center frame 63 is integrated with the center stay 24, its width can be made as narrow as possible, so that the sufficiently large opening portion can be secured.

Specifically, as shown in FIG. 3, plural penetration holes 63a are formed at the first center frame 63 such that these are arranged in the vertical direction. In the present embodiment, as shown in FIGS. 3, 5 and 6, the penetration holes 63a comprise at least eight holes which are formed at upper-and-lower parts provided along a central portion, in the vehicle width direction, of the narrow portion 63s of the first center frame 63, parts which are slightly offset outward from the central portion, in the vehicle width direction, of the upper portion of the wide portion 63w (upper-and-lower parts of the portion corresponding to the middle-level opening portion 8b), right-and-left both sides of a central portion (portion corresponding to an upper end of the lower-level opening portion 8c), in the vertical direction, of the wide portion 63w, and right-and-left both sides of a lower portion (portion corresponding to an lower portion of the lower-level opening portion 8c) of the wide portion 63w.

Meanwhile, as shown in FIGS. 6A and 8, screw insertion holes 24a are formed at portions of the back face of the center stay 24 which respectively correspond to the penetration holes 63a of the first center frame 63 in the elevational view.

As shown in FIGS. 2 and 6A, tapping screws T are inserted into the screw insertion holes 24a and the penetration holes 63a from the back-face side, respectively, whereby a shutter support portion 66i is configured and the first center frame 63 is fixedly fastened to the center stay 24 integrally.

The first center frame 63 is attached to the upper portion of the center stay 24 which is formed integrally with the central portion, in the vehicle width direction, of the shroud upper 21 at an uppermost shutter support portion 66ia (see FIGS. 6A and 8) of the plural (eight) shutter support portions 66i.

That is, the above-described upper-side width-directional center 21M of the shroud 2 is a portion which corresponds to the central portion, in the vehicle width direction, of the shroud upper 21 and the upper portion of the center stay 24 which includes the uppermost shutter support portion 66ia (see FIGS. 2 and 6A).

Likewise, the first center frame 63 is attached to the lower portion of the center stay 24 which is formed integrally with the central portion, in the vehicle width direction, of the shroud lower 22 at a lowermost shutter support portion 66ib (see FIG. 6A) of the plural (eight) shutter support portions 66i.

That is, the above-described lower-side with-directional center 22M of the shroud 2 is a portion which corresponds to the central portion, in the vehicle width direction, of the shroud lower 22 and the lower portion of the center stay 24 which includes the lowermost shutter support portion 66ib (see FIGS. 2 and 6A).

As shown in FIGS. 3 and 5, at respective sides, in the vertical direction, of the right-and-left both sides of the first center frame 63 are provided shaft support portions 67ia, 67ib, 67ic which pivotally support the respective shutter shafts 34i which are provided at the inward side of the shutters 30 of the upper-level, middle-level, and lower-level split units 3a-3c.

Specifically, the shaft support portions 67ia which pivotally support the shutter shafts 34i which are provided at the respective inward sides of a third upper-level shutter 30a3 and a fourth upper-level shutter 30a4 are provided at upper-and-lower portions of the narrow portion 63s of the first center frame 63.

Further, the shaft support portions 67ib which pivotally support the shutter shafts 34i which are provided at the respective inward sides of the middle-level shutters 30b1, 30b2 are provided at upper-and-lower portions of the wide portion 63w of the first center frame 63 which correspond to the middle-level opening portion 8b.

Similarly, as shown in FIGS. 5 and 12A which the sectional view of the major part, taken along line F-F of FIG. 3, at upper-and-lower portions of the wide portion 63w of the first center frame 63 which correspond to the lower-level opening portion 8c are provided the shaft support portions 67ic which pivotally support the shutter shafts 34i which are provided at the respective inward sides of the lower-level shutters 30c1, 30c3-30c5, except the lower-level second shutter 30c2.

Herein, as described above, the lower-level second shutter shaft 340i is not pivotally supported by the first center frame 63, and directly connected to the motor shaft 31a which protrudes from the actuator 31 provided at the first center frame 63 (see FIG. 12B), whereby the lower-level second shutter shaft 340i is pivotally supported at the motor shaft 31a on the right-and-left both sides. That is, as shown in FIGS. 3 and 5, the shaft support portion 67ic which pivotally supports the lower-level second shutter shaft 340i is not provided at respective portions of right-and-left side wall portions of the first center frame 63 which correspond to the lower-level second shutter shaft 340i, and a large-diameter penetration hole 63b which has a larger diameter than the lower-level second shutter shaft 340i is provided so that the lower-level second shutter shaft 340i can be allowed to pass through this hole 63b and connected to the motor shaft 31a (see FIGS. 3, 5 and 12B).

As shown in FIGS. 2, 3 and 5, the second center frames 64 are arranged on the both sides, in the vehicle width direction, of the latch housing portion 9, independently (separately) from the first center frame 63, as a part of the upper-level unit 3a. Each second center frame 64 is provided with shaft support portions 67ia which pivotally support the shutter shafts 34i respectively provided at the inward side, in the vehicle width direction, of the upper-level first shutter 3a1 and the upper-level second shutter 3a2.

As shown in FIGS. 2, 3 and 11, the above-described second center frame 64 is fixedly fastened from the back-face side of the shroud 2 similarly to the first center frame 63.

Specifically, as shown in FIG. 5, a penetration hole 64a is formed at the second center frame 64, and a screw penetration (through) hole 22a is formed at a portion of the shroud 2 which corresponds to the penetration hole 64a of the second center frame 64.

The shutter support portion 66i is constituted by inserting the tapping screw T into the screw insertion hole 22a and the penetration hole 64a from the back-face side, and the second center frame 64 is fixedly fastened to the shroud 2 integrally.

As shown in FIGS. 2 and 3, the outer frames 61a, 61b, 61c comprise the upper-level outer frames 61a, the middle-level outer frames 61b, and the lower-level outer frames 61c which are respectively arranged on the right-and-left both sides, which correspond to the upper-level unit 3a, the middle-level unit 3b, and the lower-level unit 3c.

As shown in FIG. 3, shaft support portions 67oa which pivotally support the shutter shafts 34o provided at the outward side, in the vehicle width direction, of the upper-level shutters 30a1-30a4 are provided the upper-and-lower portions of the upper-level outer frames 61a.

As shown in the same figure, shaft support portions 67ob which pivotally support the shutter shafts 34o provided at the outward side, in the vehicle width direction, of the middle-level shutters 30b1, 30b2 are provided the upper-and-lower portions of the middle-level outer frames 61b. Further, shaft support portions 67oc which pivotally support the shutter shafts 34o provided at the outward side, in the vehicle width direction, of the lower-level shutters 30c1-30c5 are provided the upper-and-lower portions of the lower-level outer frames 61c.

As shown in FIGS. 2 and 3, the above-described outer frames 61a, 61b, 61c are fixedly fastened from the back-face side of the shroud 2, similarly to the first and second center frames 63, 64.

Specifically, penetration holes 61d are formed at respective upper-and-lower portions of the upper-level and lower-level outer frames 61a, 61c and a middle portion, in the vertical direction, of the middle-level outer frame 61b (see FIG. 3). Further, as shown in FIG. 11, screw penetration holes 22b are formed at portions of the shroud which correspond to the above-described penetration holes 61d. Herein, only the screw penetration hole 22b which corresponds to the uppermost penetration hole 61d is illustrated in FIG. 11.

Moreover, as shown in FIGS. 2 and 11, the tapping screws T are inserted into the screw penetration holes 22b and the penetration holes 61d from the back-face side, whereby a shutter support portion 66o is constituted, and the upper-level, middle-level, and lower-level outer frames 61a, 61b, 61c are fixedly fastened to the shroud 2 from the back-face side integrally.

Thus, as shown in FIGS. 1, 2, 4 and 7, the above-described bracket 6 (see FIGS. 4 and 7) is attached to the bracket attaching-face portion 26 such that it extends in the vertical direction between the upper-level outer frame 61a (see FIG. 2) and the lower-level outer frame 61c (see the same figure).

That is, the upper-side fastening portion 26c where the bracket 6 is fastened to the bracket attaching-face portion 26 is positioned such that it matches the upper-level outer frame 61a in the vertical direction, and the lower-side fastening portion 26c is provided such that it matches (overlaps) the down-level outer frame 61c in the vertical direction (see the same figure).

Further, as shown in FIGS. 2 and 11, the upper-most shutter support portion 66o is provided such that it substantially matches the boxy-shaped portion 10 and the mount device 5 in the vertical direction. In other words, the upper-most shutter support portion 66o is provided at a portion which substantially horizontally extends inward from the inward-side side wall portion 13i of the boxy-shaped portion 10 up to a position in front of the outward edge 8ao of the upper-level opening portion 8a (see FIG. 11).

Subsequently, the swing link 70 will be described. As shown in FIGS. 2, 3, 5 and 6A, the swing link 70 comprises a pair of right-and-left first swing links 71, 71 which are provided at right-and-left both sides thereof and a pair of right-and-left second swing links 74, 74 which are provided at right-and-left and upward sides of the grille shutter unit 3 (see FIGS. 2 and 3).

As shown in FIGS. 3, 5, 12A and 12B, the first swing links 71 are arranged between the plural shutters 30 and the first center frame 63 in the vehicle width direction on the right-and-left both sides, and positioned on the back-face side relative to the shutter shafts 34i, 340i.

The pair of right-and-left first swing links 71, 71 are configured, as a part of a center swing link unit 75, in a crank shape along a shape of the right-and-left side portions of the first center frame 63 comprising the narrow portion 63s and the wide portion 63w such that the first swing links 71, 71 are substantially symmetrical (see FIGS. 3, 5 and 6A).

That is, as shown in FIGS. 2, 3, 5, 6A, 8 and 12, the center swing link unit 75 comprises the pair of right-and-left first swing links 71, 71 and plural back-face-side connection portions 72 (see FIG. 6A) which connect upper-and-lower portions of the first swing links 71, 71 in the vehicle width direction on the back-face side of the first center frame 63, which are formed integrally.

As shown in FIGS. 2, 6A, 6B, 12A, 12B, 13A and 13B, plural swing shafts 73i which protrude outward, in the vehicle width direction, from respective outward faces, in the vehicle width direction, of the pair of right-and-left first swing links 71, 71 (see FIG. 5) are pivotally attached to the first swing links 71, 71. These swing shafts 73*i* are provided in the vertical direction such that these shafts 73*i* correspond to the shutters 30 which are provided in the vertical direction on the outward sides, in the vehicle width direction, of the first swing links 71. The swing shafts 73*i* are pivotally supported at positions of the inward end faces, in the vehicle width direction, of the shutters 30 which are offset from the shutter shafts 34*i* (including 340*i*) (see FIGS. 13A, 13B).

Herein, as shown in FIGS. 6A, 6B, 13A and 13B, the swing shaft 73*i* which is pivotally supported at the lower-level second shutter 30*c*2 is set as a lower-level second swing shaft 73*ia*. Since the lower-level second shutter shaft 340*i* is directly connected to the motor shaft 31*a* as described above (see FIG. 12B), when the actuator 31 is driven, the driving force of the actuator 31 is transmitted directly to the lower-level second shutter 30*c*2, not by way of the first swing link 71, so that the lower-level second shutter 30*c*2 is driven (swung) for opening/closing.

The lower-level second swing shaft 73*ia* is swung around the lower-level second swing shaft 73*ia* in accordance with the driving of the lower-level second shutter 30*c*2. Since the first swing link 71 is swung in the vertical direction in accordance with the swing of the lower-level second swing shaft 73*ia*, the other swing shafts 73*i* than the lower-level second swing 73*ia* which are pivotally supported at the first swing link 71 are swung.

That is, the other shutters 30 (30*a*3, 30*a*4, 30*b*1, 30*b*2, 30*c*1, 30*c*3-30*c*5) than the lower-level second shutter 30*c*2 which are pivotally supported at the first center frame 63 can be swung as well.

Figure 13A:
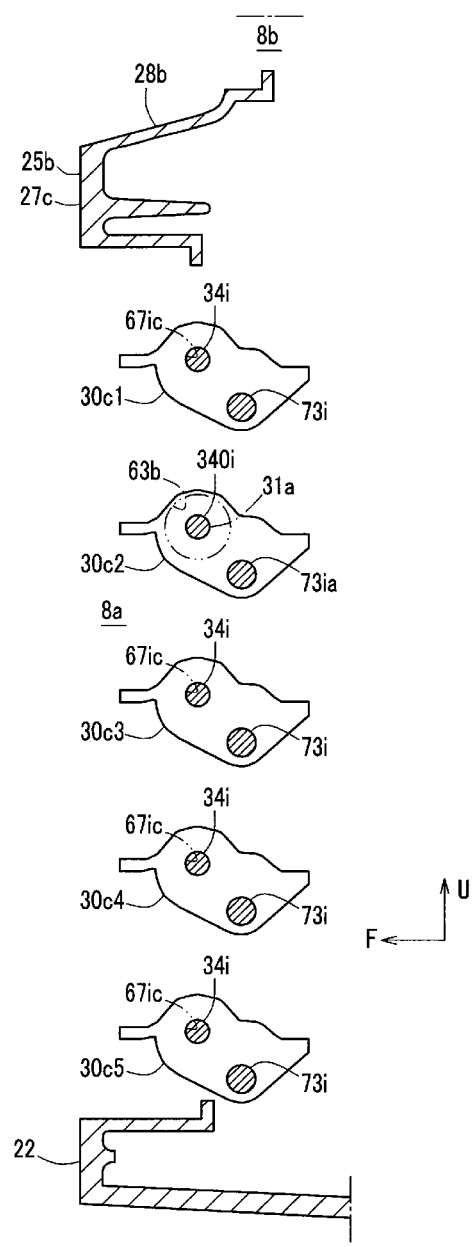
FIG. 13A is a sectional view of a major part, taken along line H-H of FIG. 2, in a state where shutters are open.

For example, the opening/closing of the lower-level opening portion 8*c* by the shutters 30 will be described particularly. In a state where the lower-level shutters 30*c* are open as shown in FIG. 13A, the first swing link 71 is positioned downward as shown in FIG. 14A, and, for example, when the motor shaft 31*a* is rotated counterclockwise by 90 degrees by driving of the actuator 31 from this open state as shown in FIG. 14B (see an arrow d2 in FIG. 14B), the lower-level second shutter 30*c*2 is rotated counterclockwise by 90 degrees around the lower-level second shutter shaft 340*i* together with the lower-level second swing shaft 73*ia* (see the arrow d2 in FIG. 13B).

Figure 13B:
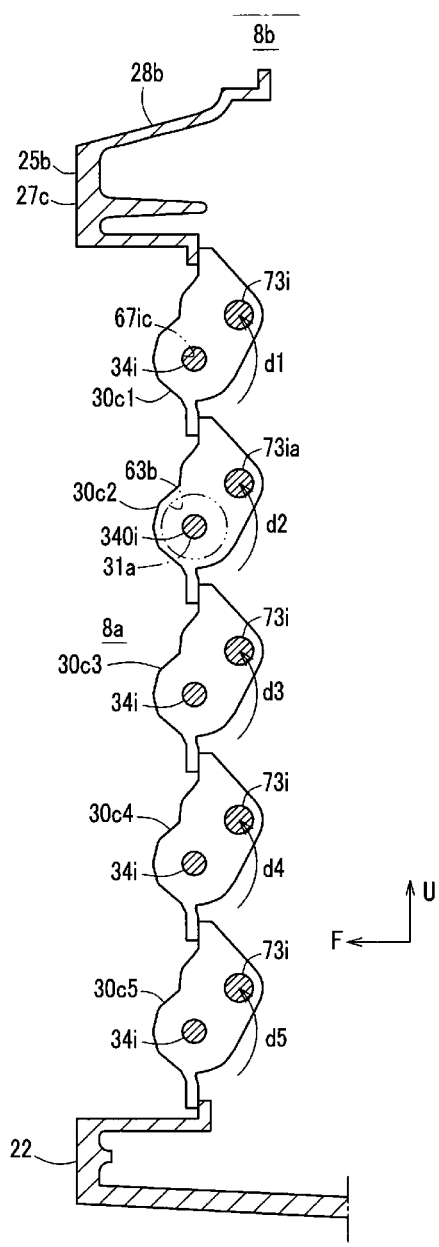
FIG. 13B is a sectional view of the major part, taken along line H-H of FIG. 2, in a state where the shutters are closed.

Thus, the lower-level second shutter 30*c*2 is in the open state as shown in FIG. 13B. At the same time, the first swing link 71 is moved upward in accordance with the above-described rotation of the lower-level second swing shaft 73*ia* as shown in FIG. 14B (see an arrow du in FIG. 14B). According to this upward move, the respective swing shafts 73*i* of the other lower-level shutters 30*c*1, 30*c*3-30*c*5 than the lower-level second shutter shaft 340*i* are rotated counterclockwise by 90 degrees (see arrows d1, d3-d5 in FIG. 14B). Consequently, the lower-level shutters 30*c*1, 30*c*3-30*c*5 are in a closed state (see arrows d1, d3-d5 in FIG. 13B).

As shown in FIGS. 2 and 3, the second swing links 74 are arranged at the right-and-left both-side upper-level units 3*a* between the upper-level shutters 30*a* and the upper-level outer frames 61*a*, and arranged on the back-face side relative to the outward-side shutter shafts 34*o* which are respectively provided at the upper-level shutters 30*a*.

The right-and-left both-side second swing links 74, 74 are integrally provided with swing shafts 73*o* which protrude inward, in the vehicle width direction, from their inward end faces (see FIG. 2), and the swing shafts 73 are provided in the vertical direction so as to correspond to the upper-level unit 30*a*. That is, the swing shafts 73*o* are attached to the outward end faces, in the vehicle width direction, of the shutters 30 such that the swing shafts 73*o* are offset from the shutter shafts 34*o* (see FIG. 3) in the vehicle side view, similarly to the above-described swing shafts 73*i*.

Herein, in the upper-level unit 3*a*, when the actuator 31 is driven, the upper-level third shutter 30*a*3 and the upper-level fourth shutter 30*a*4 are swung directly in accordance with the swinging of the first swing link 71, whereas the upper-level first shutter 30*a*1 and the upper-level second shutter 30*a*2 are not swung directly because these links 30*a*1, 30*a*2 are not directly connected to the first swing link 71.

However, since the upper-level first shutter 30*a*1 and the upper-level second shutter 30*a*2 are connected to the upper-level third shutter 30*a*3 and the upper-level fourth shutter 30*a*4 by way of the second swing link 74, the upper-level first shutter 30*a*1 and the upper-level second shutter 30*a*2 can be also swung by way of the second swing links 74 in accordance with the swinging of the upper-level third shutter 30*a*3 and the upper-level fourth shutter 30*a*4.

The present invention is the grille shutter attaching structure 1 of the automotive vehicle, in which the grille shutter unit 3 which is provided with the plural shutters 30 extending in the vehicle width direction is attached to the frame-shaped shroud 2, comprising the center stay 24 which is provided to extend in the vertical direction and connect the central portion, in the width direction, of the shroud upper 21 (the shroud-upper width center) and the central portion, in the width direction, of the shroud lower 22 (the shroud-lower width center) (see FIGS. 1 and 8), wherein the grille shutter unit 3 is attached to the back-face side of the shroud 2, and the driving actuator 31 for opening/closing the shutters 30 is arranged at the back-face side of the center stay 24 (see FIGS. 3 and 8).

According to the present structure, since the actuator 31 is arranged at the center stay 24 which is positioned at the central portion, in the vehicle width direction, of the grille shutter unit 3 in the elevation view, the right-and-left both-side shutters 30 relative to the center stay 24 can be opened or closed smoothly, and the actuator 31 can be arranged by utilizing a dead space which is created at the back-face side of the center stay 24, thereby improving the layout performance.

Moreover, since the shutters 30 can be opened/closed with an appropriate balance because of the central arrangement of the actuator 31 as described above, compared to a case where the actuator is arranged at both sides, in the vehicle width direction, of the shroud 2 or at either one of the shroud sides 23, it can be prevented that the actuator 31 has a large volume or the swing link 70 becomes large-sized and complex, so that the layout performance can be further improved.

In the embodiment of the present invention, the center stay 24 is configured such that its lower part is wider than its upper part (see FIG. 1), and the actuator 31 is arranged at the back-face side of the lower part of the center stay 24 (see FIGS. 3, 5 and 8).

According to this structure, the position of the gravity center of the grille shutter unit 3 which comprises the actuator 31 can be properly lowered, improving the rigidity of the connection portion of the central portion, in the width direction, of the shroud lower 22 and the center stay 24.

Specifically, since the center stay 24 is configured such that its lower part is wider than its upper part, the rigidity of the connection portion of the central portion, in the width direction, of the shroud lower 22 and the center stay 24.

Further, since the actuator 31 is arranged at the portion (i.e., the first center frame 63) positioned on the side of the grille shutter unit 3 which is positioned on the back-face side of the center stay 24, in addition to the above-described wide configuration of the lower part of the center stay 24, the position of the gravity center of the grille shutter unit 3 can be lowered.

In the embodiment of the present invention, the first center frame 63 which is provided at the grille shutter unit 3 is attached to the back-face side of the center stay 24 along the center stay 24 (see FIGS. 2, 6A and 8), the arrangement part of the actuator 31, in the vertical direction, of the first center frame 63 where the actuator 31 is arranged is configured to be wider than the other part of the first center frame 63 (see FIGS. 2, 3, 5 and 8), and the actuator housing portion 65 where the actuator 31 is housed is formed at the arrangement part of the actuator 31 (see FIGS. 3, 5 and 8).

According to this structure, since the arrangement parts, in the vertical direction, of the actuator 31 of the center frames 63, 64 are configured to be wide according to the width of the center stay 24, the actuator housing portion 65 where the actuator 31 is housed can be properly formed at the arrangement part of the actuator 31.

In the embodiment of the present invention, the first swing link 71 of the swing link 70 (71, 74) which transmits the driving force of the actuator 31 to the shutters 30 is arranged along the first center frame 63 (see FIGS. 3, 5 and 6A).

According to this structure, since the first swing link 71 is arranged at the center, in the vehicle width direction, of the grille shutter unit 3 (because of so-called center arrangement) together with the actuator 31, it can be prevented that the first swing link 71 becomes complex or large-sized, and also the driving force of the actuator 31 can be efficiently transmitted to the shutters 30 by way of the first swing link 71 which is arranged closely to the actuator 31.

According to this structure, in the grille shutter unit 3 in which the right-side split units 3a, 3b, 3c and the left-side split units 3a, 3b, 3c are provided as the side unit which is split and arranged on the right-and-left sides of the center frames 63, 64, the actuator 31 can drive (open/close) the shutters 30 which are provided at the right-side split units 3a, 3b, 3c and the left-side split units 3a, 3b, 3c by the first center frame 63 (and the second center frame 64) from the central side, in the vehicle width direction, of the grille shutter unit 3 with the appropriate balance.

In the embodiment of the present invention, the grille shutter unit 3 is provided with the right-side split units 3a, 3b, 3c and the left-side split units 3a, 3b, 3c as the side unit which is split and arranged on the right-and-left sides of the center frame 63 (and the second center frame 64) (see FIGS. 1-3 and 5), the first swig links 71, 71 are provided at the end portions of the right-side split units 3a, 3b, 3c and the left-side split units 3a, 3b, 3c which are positioned on the side of the first center frame 63 (see FIGS. 2, 6A and 6B), and the right-and-left first swing links 71, 71 are interconnected on the back-face side of the first center frame 63 (see FIGS. 3, 4, 6A and 8).

Since the driving force of the actuator 31 can be transmitted to the shutters 30 provided at the right-and-left split units 3a, 3b, 3c in cooperation with the right-and-left first swing links 71, 71, in addition to the rigidity improvement of the first swing link 71, by interconnecting the right-and-left first swing links 71, 71 by the back-face-side connection portion 72 on the back-face side of the first center frame 63 as described above, the opening/closing driving of the shutters 30 can be properly smooth, compared to a case, for example, where the swing link is configured such that a right-side one and a left-side one are provided independently from each other and the driving force of the actuator 31 is transmitted to the shutters 30 which are provided at the right-and-left split units 3a, 3b, 3c by way of the above-described independently-provided right-and-left swing links.

In the embodiment of the present invention, the latch housing portion 9 where the latch (not illustrated) of the bonnet is housed is provided at the central portion, in the width direction, of the shroud upper 21 such that the latch housing portion 9 protrudes toward the upper-level opening portion 8a (see FIGS. 1 and 2), the first upper-level shutter 30ai and the second upper-level shutter 30a2 which are not driven directly by the first swing links 71 are provided on the right-and-left both sides of the latch housing portion 9 (see FIGS. 1-3 and 5), and the second swing links 74 which are different from the first swing links 71 are provided on the outward side, in the vehicle width direction, of the first upper-level shutter 30ai and the second upper-level shutter 30a2 so as to drive these shutters 30a1, 30a2 (see FIGS. 2 and 3).

According to this structure, even in the structure where the first upper-level shutter 30ai and the second upper-level shutter 30a2 which are arranged on the right-and-left both sides of the latch housing portion 9 in accordance with forming the latch housing portion 9 are not driven directly by the first swing links 71, these shutters 30a1, 30a2 can be smoothly driven by the second swing links 74.

In the embodiment of the present invention, the first center frame 63 is attached such that the first center frame 63 connects the central portion, in the width direction, of the shroud upper 21 (the upper-side width-directional center 21M of the shroud 2) and the central portion, in the width direction, of the shroud lower 22 (the lower-side width-directional center 22M of the shroud 2), being integrated with the center stay 24.

According to this structure, the center stay 24 can secure the rigidity, in the vertical direction, of the shroud 2 together with the first center frame 63. Further, since the lower part of the first center frame 63 which houses the actuator 31 as a weight object is configured to be wide similarly to the center stay 24, the high rigidity can be secured, and since the upper part of the first center frame 63 is integrated with the center stay 24, its width can be made as narrow as possible, so that the sufficiently large opening portion can be secured.

Further, since the grille shutter attaching structure 1 of the automotive vehicle of the present embodiment adopts a center arrangement of the actuator 31 where the actuator 31 is arranged at the center, in the vehicle width direction, of the grille shutter unit 3, the first upper-level shutters 30a1 and the second upper-level shutters 30a2 which are arranged on the right-and-left both sides and the second swing links 74, 74 which are provided at the outward side, in the vehicle width direction, of the shutters 30a1, 30a2 can be driven with the appropriate balance.

The present invention is not limited to the above-described embodiment, but any other various embodiments are applicable. For example, while the shutter shafts 34i, 34o are provided on the side of the shutters 30 and the frames 60 (61a, 61b, 61c, 63, 64) are pivotally supported by the shutter shafts 34i, 34o in the above-described embodiment, these shutter shafts 34i, 34o may be provided on the side of the frames 60 (61a, 61b, 61c, 63, 64) and the shutters 30 may be pivotally supported by the shutter shafts 34i, 34o, for example.

Moreover, while the swing shafts 73i, 73o are provided on the side of the first and second swing links 71, 74 and the shutters 30 are pivotally supported by the swing shafts 73i, 73o in the above-described embodiment, these swing shafts 73i, 73o may be provided on the side of the shutters 30 and the first and second swing links 71, 74 may be pivotally supported by the swing shafts 73i, 73o, for example.

What is claimed is:

1. A grille shutter attaching structure of an automotive vehicle, comprising:

a frame-shaped shroud;

a grille shutter unit provided with plural shutters extending in a vehicle width direction; and a center stay provided to extend in a vertical direction and connect a central portion, in a width direction, of a shroud upper of the shroud and a central portion, in the width direction, of a shroud lower of the shroud, wherein said grille shutter unit is attached to a back-face side of said shroud, and a driving actuator for opening/closing said shutters is arranged at a back-face side of said center stay of said grille shutter unit, said center stay is configured such that a lower part thereof is wider than an upper part thereof, and said driving actuator is arranged at a back-face side of the lower part of the center stay, a center frame which is provided at said grille shutter unit is attached to the back-face side of said center stay along the center stay, an actuator arrangement part, in the vertical direction, of said center frame where said driving actuator is arranged is configured to be wider than the other part of the center frame, and an actuator housing portion where the driving actuator is housed is formed at said actuator arrangement part, a driving link which transmits a driving force of said driving actuator to said shutters is arranged along said center frame, and a latch housing portion where a latch of a bonnet is housed is provided at said central portion, in the width direction, of the shroud upper such that the latch housing portion protrudes toward an opening portion which is formed at an inside, in an elevational view, of said frame-shaped shroud, right-and-left indirect swing shutters which are not driven directly by said driving link are provided on right-and-left both sides of said latch housing portion, and a second driving link which is different from said driving link is provided on an outward side, in the vehicle width direction, of said indirect swing shutters so as to drive the indirect swing shutters.

2. The grille shutter attaching structure of the automotive vehicle of claim 1, wherein said grille shutter unit is provided with right-and-left split side units which are provided on right-and-left both sides of said center frame, said driving link comprises right-and-left driving links which are provided at respective end portions of said right-and-left split side units which are positioned on a center-frame side in the vehicle width direction, and said right-and-left driving links are interconnected on a back-face side of the center frame.

3. The grille shutter attaching structure of the automotive vehicle of claim 1, wherein said center frame is attached such that the center frame connects the central portion, in the width direction, of said shroud upper and the central portion, in the width direction, of said shroud lower, being configured to be integrated with said center stay.

* * * * *